United States Patent

[11] 3,613,749

| [72] | Inventor | Grady O. Geurian<br>1305 North Front St., Dardanelle, Ark. 72834 |
|---|---|---|
| [21] | Appl. No. | 32,847 |
| [22] | Filed | Apr. 29, 1970 |
| [45] | Patented | Oct. 19, 1971 |

[54] SAW CHAIN WITH DUAL CUTTERS
6 Claims, 5 Drawing Figs.

| [52] | U.S. Cl. | 143/135 R |
|---|---|---|
| [51] | Int. Cl. | B27b 33/14 |
| [50] | Field of Search | 143/135, 135 G, 135 H; 83/201 |

[56] References Cited
UNITED STATES PATENTS

| 2,622,636 | 12/1952 | Cox | 143/135 G |
| 2,826,226 | 3/1958 | Donley | 143/135 R |
| 3,036,606 | 5/1962 | Richardson | 143/135 G |
| 3,346,025 | 10/1967 | Anderson et al. | 143/135 R |

FOREIGN PATENTS

| 371,252 | 8/1963 | Switzerland | 143/135 R |

Primary Examiner—Donald R. Schran
Attorneys—Clarence A. O'Brien and Harvey B. Jacobson ABSTRACT: A saw chain includes laterally spaced and aligned cutting teeth that have outwardly rolled cutting edges. The leading edges of the cutting teeth have pilot lugs formed therein to guide the cutting teeth along a cut. The trailing edges of the cutting teeth include stabilizing lugs for increasing the cutting efficiency of the teeth. As the cut is formed, a high center is produced at the bottom of the cut which acts as a track for the cutting teeth.

3,613,749

PATENTED OCT 19 1971

Grady O. Geurian
INVENTOR.

BY Clarence A. O'Brien
and Harvey B. Jacobson
Attorneys

PATENTED OCT 19 1971 3,613,749
SHEET 2 OF 2
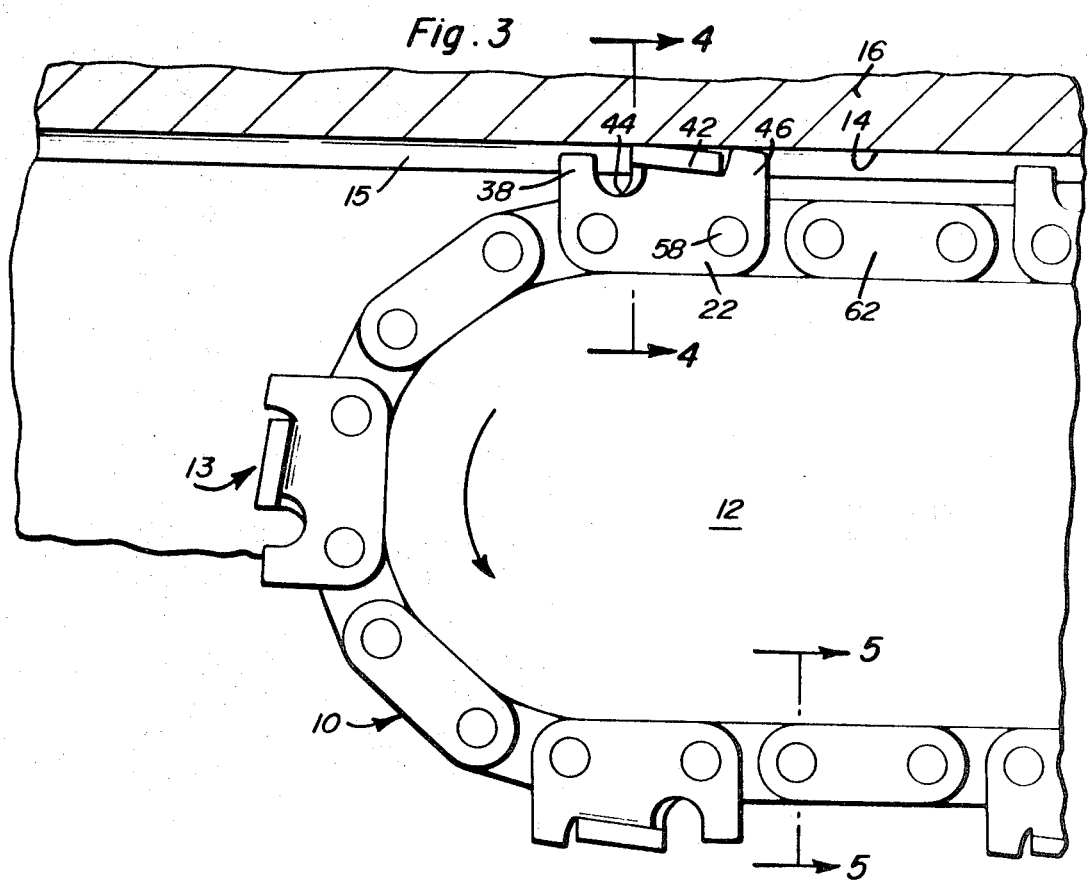
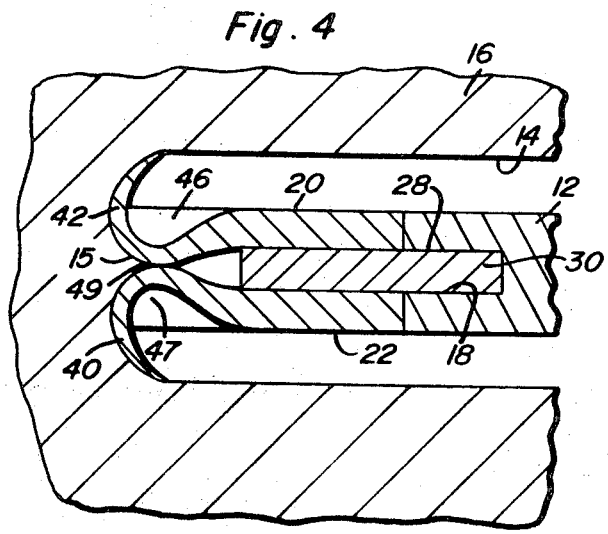
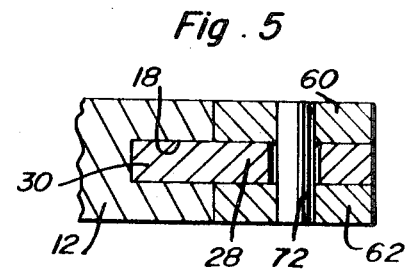
Grady O. Geurian
INVENTOR
BY Clarence A. O'Brien
and Harvey B. Jacobson
Attorneys

SAW CHAIN WITH DUAL CUTTERS

The present invention relates to saw chains and more particularly to the structure of cutting teeth therefor.

Conventional saw chains usually have cutting members or teeth with cutting edges formed in laterally alternating offset relation with respect to longitudinal chain travel. Because each cutting member does not simultaneously cut in both lateral directions, the cutting edges frequently catch the side of the formed cut thereby resulting in the deviation of the cutting teeth from a true cut. In such circumstances, the sawing operation becomes less efficient and the finished cut is uneven. Often, the uneven cut causes the chain to bind thereby overloading the power source.

The present invention includes cutting members that have laterally aligned and oppositely directed cutting edges that form an even cut with a high center in the bottom of the cut which serves as a track for the cutting members. Each cutting member is comprised of laterally aligned and spaced cutting teeth that have pilot lugs at the leading ends which guide the teeth along the cut. The trailing ends of the teeth include stabilizing lugs which stabilize the travel of the cutting members along the cut. The pilot and stabilizing lugs engage the high center of the cut so that the final cut is even and is produced with ease.

Another object of the invention is to provide cutting teeth which may be easily and accurately sharpened by using a round emery and swage block assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a plan view illustrating the contact between the present saw chain and an object being cut.

FIG. 4 is a partial sectional view taken along a plane passing through the section line 4—4 in FIG. 3.

FIG. 5 is a partial sectional view taken along a plane passing through section line 5—5 of FIG. 3.

Figure 1:
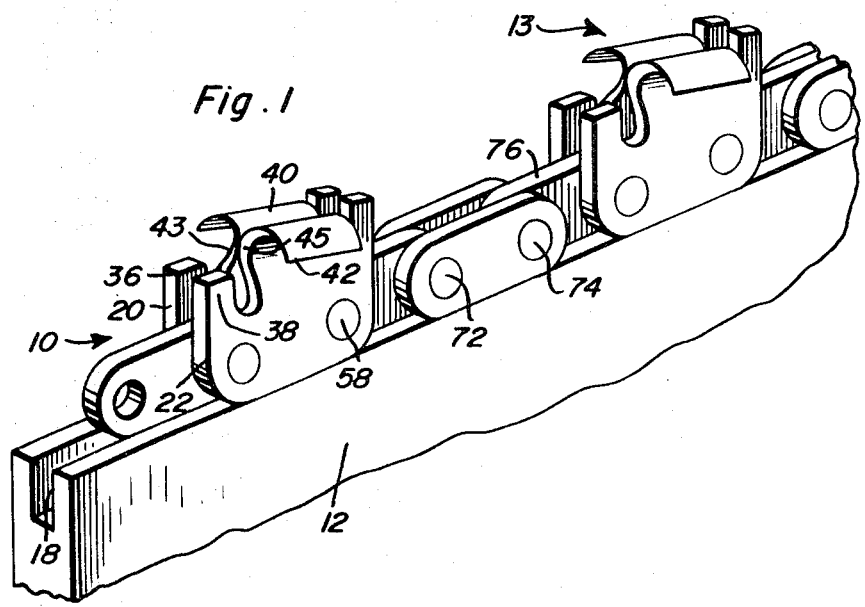
FIG. 1 is a partial perspective view illustrating a section of the present saw chain.

Referring initially to FIGS. 1 and 3, the present chain saw is seen to include a chain indicated by reference 10 which is movably mounted on a cutter bar 12. As seen in FIG. 3, cutting members 13 on the chain are placed into contact with an object 16 to be cut. As the sawing progresses, a cut 14 is made with a high center 15 formed at the bottom of the cut which serves as a raised track for longitudinally guiding the cutting members.

Figure 2:
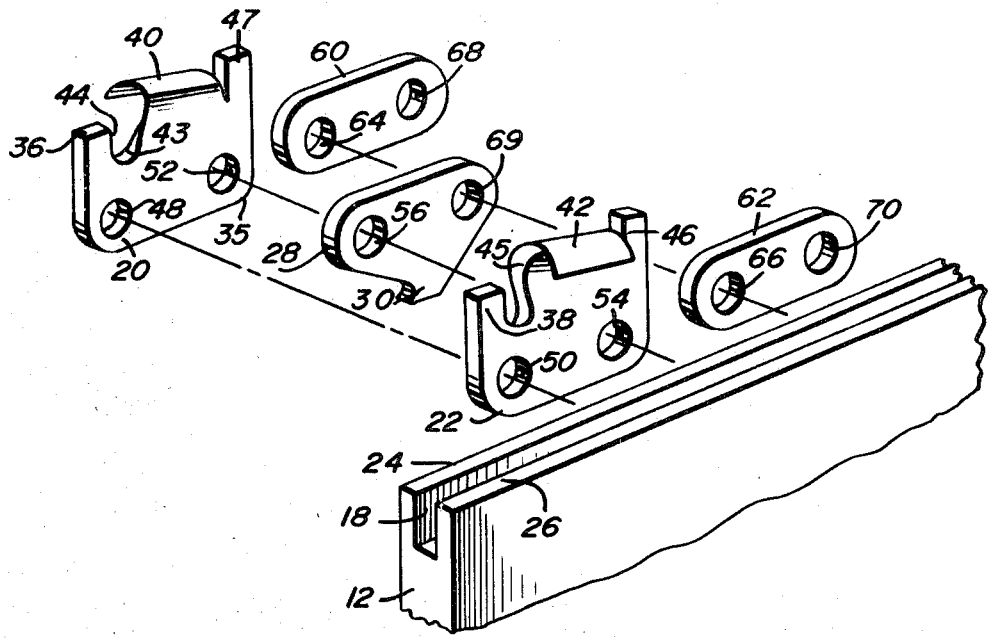
FIG. 2 is an exploded view illustrating the components shown in FIG. 1.

FIGS. 1 and 2 show that the cutter bar 12 includes a peripheral groove 18 that guides the chain around the cutter bar 12 during powered operation from a source (not shown). Each cutter member 13 is comprised of laterally aligned and adjacently spaced cutter teeth 20 and 22. The lower edges of teeth 20 and 22 are adapted to ride along the shoulders 24 and 26, respectively, of the cutter bar 12. A driver link or member 28 is pivotally clamped between the cutter teeth. The generally oblong body of the driver member 28 includes a projection or tail element 30 which rides in groove 18.

Still referring to FIGS. 1 and 2, the cutter teeth include respective pilot lugs 36 and 38 which extend from the upper leading edges of the cutting teeth 20 and 22, respectively. As shown in FIG. 4, these pilot lugs act as depth gauges with an intermediate lateral spacing which saddles the high center 15 at the base of the cut. Laterally outwardly rolled cutting edges 40 and 42 are formed in the cutter teeth 20 and 22, respectively, and have knife edges 43 and 45 formed along the leading edges thereof for biting into a cut. As will be noted in FIG. 3, the cutting edges slope downwardly to the rear to maximize cutting efficiency. Undercuts 44 are formed between the pilot lugs and the cutting edges to serve as guide means for chip removal during a cutting operation.

Stabilizer lugs 47 and 46 respectively associated with cutter teeth 20 and 22 laterally abut the high center 15 of the cut and serve to stabilize traveling cutting teeth. The leading edges of the stabilizer lugs 47 and 46 contact the bottom of the cut and the outward edges of the stabilizer lugs slope forwardly inwardly toward the trailing edges of the cutter teeth as clearly illustrated in FIG. 3.

The disposition of the cutter teeth with respect to the formed cut is clearly shown in FIG. 4 wherein the cutting edges 40 and 42 are seen to contact one another at a junction point 49 where the cutting edges begin to flare outwardly. The high center 15 of the cut is formed along this junction.

Referring back to FIG. 2, the trailing edge portions of the cutter teeth 20 and 22 include laterally aligned apertures 52 and 54 disposed in registry with an aperture 56 formed in the leading edge portion of the driver member 28. Likewise, apertures 48 and 50 are formed in the leading edge portions of the cutter teeth 20 and 22. The apertures are laterally aligned to allow pivotal clamping of another driver member therebetween. By suitably pivotally clamping driver member 28 between the cutter teeth with rivets or the like, the cutter teeth are free to conform to the oblong surface of a conventional cutter bar 12. This situation is illustrated in FIG. 3 wherein rivets 58 are illustrated as securing the cutter teeth and intermediately clamped driver members. As shown in FIG. 2, laterally spaced oblong connecting links 60 and 62 ride along shoulders 24 and 26 of the cutter bar. Apertures 64 and 66 formed in the leading edge portions of the connecting links are maintained in registry and aligned with an aperture 69 formed in the trailing end portion of driver member 28. A rivet 72 (FIG. 1) is inserted between the latter mentioned apertures to complete pivotal securement of the connecting links and the driver member 28. The described sequence of pivotally connected components continues along the length of the chain. Thus, a rivet 74 (FIG. 1) connects apertures 68 and 70 in the trailing edges of links 60 and 62, the rivet pivotally securing an adjacent driver member 76. The cutting edges of the cutter teeth can be filed or ground with a small round emery wheel or grinder. Then, by using a swage block, the cutting edges may be flared slightly thereby assuring a uniform cutting edge which will give a smooth uniform cut without the chain binding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A saw chain movably mounted on a cutter bar, the chain comprising a plurality of spaced dual cutting means for forming a cut characterized by a high bottom center which serves as a center guide track for the dual cutting means, said cutting means comprising a pair of laterally spaced and aligned cutter teeth having a central body portions, pilot lugs extending from the leading edges of the body portions for guiding the teeth along the high bottom center, flared cutting edges rolled outwardly from intermediate sections of the central body portions for cutting an object, and stabilizing lugs extending outwardly from the trailing edges of the central body portions and contacting the high bottom center for stabilizing the cutter teeth during a cutting operation.

2. The structure of claim 1 wherein undercuts are formed in the central body portions between each pilot lug and cutting edge for guiding chip removal.

3. The structure of claim 1 wherein the pilot lugs ride laterally astride the high center of the cut, the cutting edges having leading edges contacting the bottom of the cut and trailing edges sloping outwardly from the cut, and further wherein the stabilizing lugs contact the cut and slope at substantially the same angle as the cutting edges.

4. The structure of claim 2 wherein driver members are pivotally clamped between the cutter teeth, the members extending into a groove formed in the cutter bar for guiding the saw chain around the cutter bar.

5. The structure of claim 2 wherein a pair of longitudinally disposed driving members are pivotally clamped between the cutter teeth, each member extending into a groove formed in the cutter bar and guiding the saw chain around the bar.

6. The structure of claim 5 together with connecting links pivotally linking the confronting driving member ends of adjacent cutter teeth.